(No Model.)
H. BASKERVILLE.
FRUIT SHIPPING PACKAGE.
No. 538,219. Patented Apr. 23, 1895.
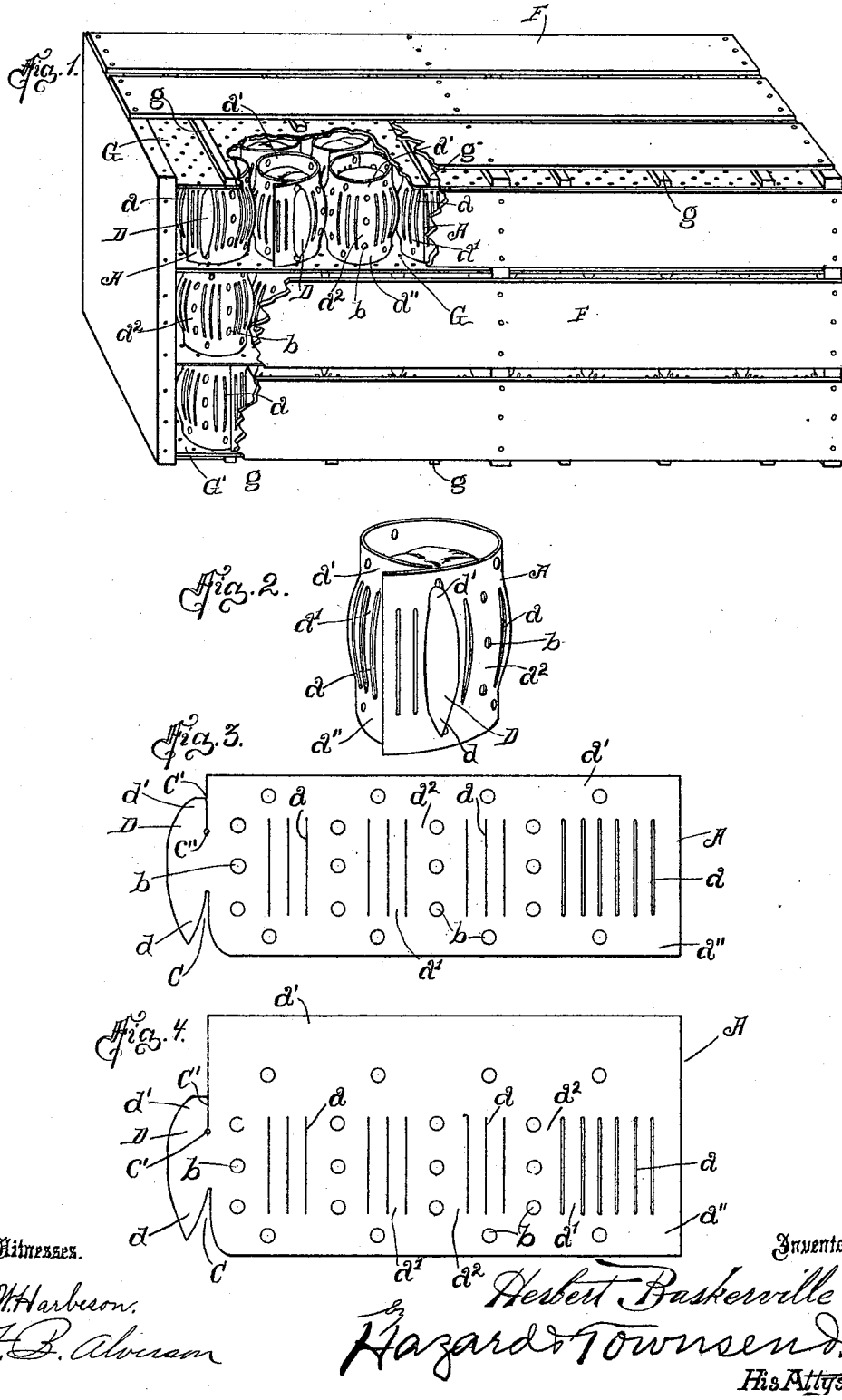
Witnesses.
O. W. Harbeson.
F. B. Alvram.
Inventor.
Herbert Baskerville
by Hazard & Townsend
His Attys.
THE NORRIS PETERS CO., PHOTO-LITHO., WASHINGTON, D. C.

UNITED STATES PATENT OFFICE.

HERBERT BASKERVILLE, OF ST. HELENA, ASSIGNOR OF ONE-HALF TO CHARLES A. BASKERVILLE, OF LOS ANGELES, CALIFORNIA.

FRUIT-SHIPPING PACKAGE.

SPECIFICATION forming part of Letters Patent No. 538,219, dated April 23, 1895.

Application filed October 15, 1894. Serial No. 525,857. (No model.)

*To all whom it may concern:*

Be it known that I, HERBERT BASKERVILLE, a citizen of the United States, residing at St. Helena, in the county of Napa and State of California, have invented certain new and useful Improvements in Fruit-Shipping Packages, of which the following is a specification.

My invention relates to that class of fruit shipping devices in which the separate fruits are placed in separate wrappers mounted on ventilating partitions in a crate.

The object of my invention is to provide superior means for ventilating the fruit and to prevent all jamming and also to prevent contamination of sound fruit by fruit which may become rotten during transportation.

My invention relates more particularly to improvements of the wrapper in which the separate fruits are incased when placed within the crate.

The accompanying drawings illustrate my invention.

Figure 1 shows my invention as applied in the shipment of fruit. Fig. 2 shows one of my improved wrappers applied to the fruit ready for shipment. Fig. 3 shows a form of wrapper adapted for fruit that is approximately spherical such as peaches, oranges, plums, &c. Fig. 4 shows a form of wrapper more especially adapted for pyriform fruit such as pears, figs, &c.

My improvement in packages for shipping fruit comprises a wrapper A of pasteboard or other suitable material having flexible qualities, but also being sufficiently stiff when in cylindrical form to support the weight of the fruit, when the cylinder is set on end; the same being provided at intervals along its length with transverse slits $a$ and, consequently, with intermediate transverse bars $a^2$ arranged at a distance from the edges of the wrapper, so that there is a collar or band $a'$, $a''$ along each side of the row of slits, and having a tongue D arranged between the collars and in line with the slits to insert into the slits for fastening the wrapper in place around the fruit, substantially as shown and hereinafter more particularly described.

The transverse slits $a$ serve a three-fold purpose, viz: They afford fastening sockets or seats for the tongue, they afford ventilation, and also cause the wrapper to afford an elastic and perfect support for the fruit. The slits allow a free access of the air to the body of the fruit, and they also allow the wrapper to expand or bulge out between the collars or bands $a'$, $a''$, so as to conform to the bulge of the fruit. While the unslitted portion or collars $a'$, $a''$ along the edges of the wrapper retain the original length, the portion of the wrapper between such collars is allowed to expand, so that the fruit is clasped and held by the wrapper and is prevented from slipping toward the edges so that when the fruit has been incased in the wrapper and the tongue has been passed through its appropriate slit, the fruit will be held from slipping to the end of the cylinder formed by the wrapper thus applied.

The series of slits afford convenient means for fastening the end tongue and for adjusting the wrapper to the exact size of the fruit to be incased.

The unslitted bands or collars at the edges of the wrapper are to be wide enough to extend beyond the fruit when the same has been thus incased with the slitted portion fitted to the bulge of the fruit; and therefore in some of the wrappers the band on one side is made wider than that upon the other side as indicated in Fig. 4. This arrangement is designed for use on fruits like pears, for example, in which the bulge is nearer one end than the other. When the separate fruits are thus incased in separate wrappers they are placed in a ventilated crate F having perforated partitions G and the whole is then ready for shipment.

The top and bottom partitions G, G', of the crate, are respectively provided with cleats $g$ which hold the partition away from the top and bottom of the crate respectively, so as to allow free access of air from outside the crate to the ventilating holes in the partition.

The tongue D is provided with two teeth or catches $d$, $d'$. The outer edge of each tooth or catch is curved. The edges of the teeth which are next to the body of the wrapper are formed respectively by the notches C, C'. The notch C widens in curves from its inner point outward toward the edge of the wrapper so that the tooth $d$ is pointed. The other notch $C'$ consists in a simple straight slit extending from the outer end of the tooth to the perforation $c'$.

In applying the wrapper to the fruit it is drawn thereon so as to fit the fruit nicely and the head of the tongue is then inserted from the inner side of the wrapper toward the outer side thereof through that one of the transverse slits which will cause the wrapper to fit the fruit tightly when the tongue is fully seated in such slit.

To insert the tongue into the transverse slit the sharp pointed tooth $d$ is first inserted and then the other tooth is slipped into place after which the wrapper is brought into position as shown in Figs. 1 and 2. The notch slit $C'$ is so narrow as to cause the body of the wrapper inserted therein to be clamped between the tooth $d'$ and the end of the wrapper. The fruit cannot move in the wrapper, or but slightly so; and therefore if the crates tilt or turn upside down the fruit is held from moving or dropping from end to end of the wrapper which might bruise or otherwise damage the fruit if it were ripe or soft. The pieces of fruit inclosed in the wrapper are held firmly yet gently thus preventing any bruising or chafing. By these means ripe fruit can be transmitted in good condition to greater distances with less loss than with wrappers in which the fruit would be liable to slip from end to end.

To remove the wrapper the operation above described is reversed, the tooth $d$ being first drawn out. The tooth $d'$ is shorter than the tooth $d$ and does not extend to the edge of the wrapper, thus facilitating its removal from the slit.

Some of the transverse bars $a'$ between the slits are narrow in order that they may readily bend to conform to the fruit; but others of the transverse bars $a^2$ are wider, so as to give greater strength to the support. These wider bars are arranged at intervals between the narrow bars and are provided with ventilating holes $b$. The end of the wrapper which is opposite the tongue is provided with a number of the transverse slits so as to allow the band to be adjusted to closely fit the fruits of different sizes. However, it is desirable in practice that wrappers of different sizes be provided for fruits which vary considerably in size. Wrappers for the larger fruits are made both wider and longer than those for the smaller fruits and in case of wrappers for pear-shaped fruits one of the collars is much wider than the other to accommodate the neck of the fruit.

Now, having described my invention, what I claim as new, and desire to secure by Letters Patent, is—

The fruit wrapper set forth having flexible qualities but also being sufficiently stiff when in cylindrical form to support the weight of the fruit when the cylinder is set on end, and provided at intervals along its length with the transverse slits and bars arranged at a distance from the edges of the wrapper, so that there is a collar or band each side of the row of slits and the bars, and having a tongue arranged between the collars and in line with the slits to insert into the slits for fastening the wrapper in place around the fruit, so that when the wrapper is fastened around the fruit there will be an expansion of the middle portion of the wrapper and a consequent holding of the fruit firmly substantially as set forth.

HERBERT BASKERVILLE.

Witnesses:
W. A. MACKINDER.
F. B. MACKINDER.